United States Patent
Wang

(10) Patent No.: US 7,516,233 B2
(45) Date of Patent: Apr. 7, 2009

(54) METHOD FOR CLASSIFYING NETWORK CONNECTIONS AND TRANSMITTING MULTIMEDIA DATA

(75) Inventor: Jen-Li Wang, Taipei (TW)

(73) Assignee: Compal Electronics, Inc., Taipei (TW)

( * ) Notice: Subject to any disclaimer, the term of this patent is extended or adjusted under 35 U.S.C. 154(b) by 613 days.

(21) Appl. No.: 11/160,982

(22) Filed: Jul. 19, 2005

(65) Prior Publication Data

US 2006/0221836 A1    Oct. 5, 2006

(30) Foreign Application Priority Data

Apr. 1, 2005    (TW) .............................. 94110440 A

(51) Int. Cl.
  *G06F 15/16* (2006.01)
  *G06F 15/173* (2006.01)
  *H04N 7/18* (2006.01)
  *H04J 1/16* (2006.01)
(52) U.S. Cl. .................. 709/231; 709/240; 709/250; 725/80; 370/235
(58) Field of Classification Search ............ None
  See application file for complete search history.

(56) References Cited

U.S. PATENT DOCUMENTS

| | | | | |
|---|---|---|---|---|
| 6,023,456 | A * | 2/2000 | Chapman et al. ............ | 370/252 |
| 6,252,872 | B1 * | 6/2001 | Tzeng ........................ | 370/360 |
| 6,360,265 | B1 * | 3/2002 | Falck et al. ................. | 709/227 |
| 6,449,588 | B1 * | 9/2002 | Bowman-Amuah .......... | 703/21 |
| 6,671,258 | B1 * | 12/2003 | Bonneau ..................... | 370/235 |
| 6,775,804 | B1 * | 8/2004 | Dawson ...................... | 714/776 |
| 6,826,147 | B1 * | 11/2004 | Nandy et al. ................ | 370/229 |
| 7,190,698 | B2 * | 3/2007 | Svanberg et al. ......... | 370/395.2 |
| 7,289,480 | B2 * | 10/2007 | Lundstrom et al. .......... | 370/338 |
| 2001/0043609 | A1 * | 11/2001 | Chapman et al. ............ | 370/401 |
| 2002/0007416 | A1 * | 1/2002 | Putzolu ...................... | 709/231 |
| 2003/0236918 | A1 * | 12/2003 | Manor et al. ................ | 709/250 |
| 2004/0246962 | A1 * | 12/2004 | Kopeikin et al. ............ | 370/392 |

FOREIGN PATENT DOCUMENTS

TW    589837    6/2004

OTHER PUBLICATIONS

Schulzrinne et al., "RFC 1889", Jan. 1996.*
Chen et al., "An Adaptive Multimedia Transmission Protocol for Distributed Multimedia Applications," p. 537 of IEEE 23$^{rd}$ International Conference on Distributed Computing Systems Workshops, 2003.*

* cited by examiner

*Primary Examiner*—Wen-Tai Lin
(74) *Attorney, Agent, or Firm*—Jianq Chyun IP Office

(57) ABSTRACT

A data transmission method for classifying network connections and transmitting multimedia data is described. After distinguishing multimedia connections from non-multimedia connects, multimedia packets are classified and consolidated into packet groups and then the packet groups are transmitted. The method for transmitting multimedia data comprises the following steps. First, determine whether a connection is used for transmitting multimedia data or not. If it does, the packets are consolidated into a packet group. Finally, forward the packet group according to a predetermined order after the packet group is assembled.

15 Claims, 4 Drawing Sheets

METHOD FOR CLASSIFYING NETWORK CONNECTIONS AND TRANSMITTING MULTIMEDIA DATA

CROSS-REFERENCE TO RELATED APPLICATION

This application claims the priority benefit of Taiwan application serial no. 94110440, filed on Apr. 1, 2005. All disclosure of the Taiwan application is incorporated herein by reference.

BACKGROUND OF THE INVENTION

1. Field of the Invention

The present invention relates to a method of transmitting data through a classification of network connections. More particularly, the present invention relates to a multimedia data transmission method for saving transmission bandwidth. The method includes classifying the network connections and consolidating packets into packet groups and transmitting the package groups if the network connection is a multimedia connection.

2. Description of the Related Art

The conventional method of transmitting the data within a file includes cutting up the file into a plurality of manageable packets and transmitting them in a time sequence. Hence, when a server transmits a multimedia file such as the one shown in FIG. 1, the server will cut up the multimedia file into a plurality of image packets (V1-1, V1-2, V1-3 . . . ), a plurality of sound packets (A1-1, A1-2, A1-3 . . . ) and a plurality of parameter packets (P1-1, P1-2, P1-3, . . . ). Thereafter, the packets are transmitted one after the other in a time ordered sequence as shown in FIG. 2. As shown in FIG. 2, the first transmitted packet is the image packet V1-1. After that, the sound packet A1-1, the general data packet P1-1, the image packet V1-2, the sound packet A1-2 and so on is transmitted out one by one.

One major disadvantages for this arrangement is that the server needs to wait for a brief period after completing the transmission of the first image packet V1-1 but before transmitting the first sound packet A1-1. Similarly, there is a waiting gap in the transmission of all subsequent packets. The accumulation of a vast number of time gaps can lead to a considerable waste of transmission bandwidth and a slow down of file reception at client's terminal.

A data transmission control system and method is provided in Taiwan Pat. No. 589837. The method includes separating out and transmitting the control packets of Transmission Control Protocol (TCP) as soon as possible to increase the transmission efficiency. However, this method does not address the waste in bandwidth transmission due to the presence of inter-packet gaps and does not provide any additional processing for multimedia data.

SUMMARY OF THE INVENTION

Accordingly, at least one objective of the present invention is to provide a data transmission method that utilizes a classification of network connections to distinguish multimedia connections from non-multimedia connection and then consolidates the multimedia packets into packet groups before transmitting the packet groups. In this way, some transmission bandwidth is saved and the transmission efficiency is increased.

At leas a second objective of the present invention is to provide a data transmission method that utilizes a classification of network connections to reduce inter-packet time gap during packet transmission so that some transmission bandwidth is saved and the transmission efficiency is increased.

To achieve these and other advantages and in accordance with the purpose of the invention, as embodied and broadly described herein, the invention provides a data transmission method that utilizes a classification of network connections. The method in the present invention includes performing a classification of the network connections. The classification of network connections includes the following steps. First, the network connections of the packets are inspected. If the transmission port at the source terminal or the destination terminal of a network connection is a transmission port for standard non-multimedia transmission protocol, then the network connection is classified as a non-multimedia network connection. On the other hand, if the transmission port at the source terminal or the destination terminal of a network connection is a transmission port for standard multimedia transmission protocol, then the network connection is classified as a multimedia network connection. Finally, if the transmission port at the source terminal or the destination terminal of a network connection is neither a transmission port for standard non-multimedia transmission protocol nor a transmission port for standard non-multimedia transmission protocol, then the network connection is classified as either a multimedia network connector or a non-multimedia network connection according to the transmission history of the application program that opened the network connection.

In one embodiment in the aforementioned method of classifying network connections, the method of classifying network connections according to the transmission history further includes the following steps. First, the network connection is used to renew the transmission history. If the transmission history conforms to the characteristics of the multimedia transmission protocol, then the network connection is classified as a multimedia network connection. If the transmission history does not conform to the characteristics of the multimedia protocol, and furthermore, the number of packets analyzed through the application program according to the present method reaches a preset value, then the network connection is classified as a non-multimedia network connection. Finally, if the transmission history does not conform to the characteristics of the multimedia transmission protocol, and furthermore, the number of packets analyzed through the application program according to the present method has not yet reached the preset value, then the classification of the network connection is suspended and the analysis of the packets is continued.

From another perspective, the present invention provides a multimedia data transmission method comprising the following steps. First, determine whether the network connection of the packets is a multimedia network connection or not. If the network connection is a multimedia network connection, then the packets are added to a packet group until the packet group is consolidated. Thereafter, the packet group is transmitted.

In one embodiment of the aforementioned multimedia data transmission method, the method of determining whether the network connection is a multimedia network connection further includes the following steps. First, determine whether the transmission protocol of the network connection is a Transmission Control Protocol (TCP) or not. If the transmission protocol of the network connection is a Transmission Control Protocol, then determine whether the network connection is a multimedia network connection according to the source IP address (IP represents Internet protocol), the source transmission port, the destination address and the destination transmission port of the network connection.

In one embodiment of the aforementioned multimedia data transmission method, the method of determining whether the network connection is a multimedia network connection according to the source IP address and so on parameters further includes the following steps. First, determine whether the network connection has already been registered in a connection table according to the source IP, the source transmission port, the destination address and the destination transmission port of the network connection. If the network connection has not yet been registered in the connection table, the network connection is added to the connection table but registered as being unclassified. Thereafter, the network connection is classified into either a multimedia network connection or a non-multimedia connection. If the network connection has already been registered in the connection table but remains unclassified, then the network connection is classified into either a multimedia network connection or a non-multimedia network connection. Finally, if the network connection has already been registered in the connection table and classified as a multimedia network connection or a non-multimedia network connection, the network connection is determined to be a multimedia network connection or not according to the classification in the connection table.

From another perspective, the present invention also provides a multimedia data transmission method having technical aspects similar to the aforementioned multimedia data transmission method. Furthermore, the aforementioned network connection classification method is used to classify the network connections.

The first principle behind the present invention is to find the network connection for transmitting multimedia data. Then, the packets for transmitting via a multimedia network are classified into groups and the packets containing similar type of data are consolidated into packet groups. Thereafter, according to a pre-determined order based on the data type or degree of importance, the packet groups are sequentially transmitted. Thus, inter-packet time gaps during packet transmission is reduced, thereby leading to some saving in the network bandwidth and an increase in the transmission efficiency.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE PREFERRED EMBODIMENTS

Figures 1, 2:
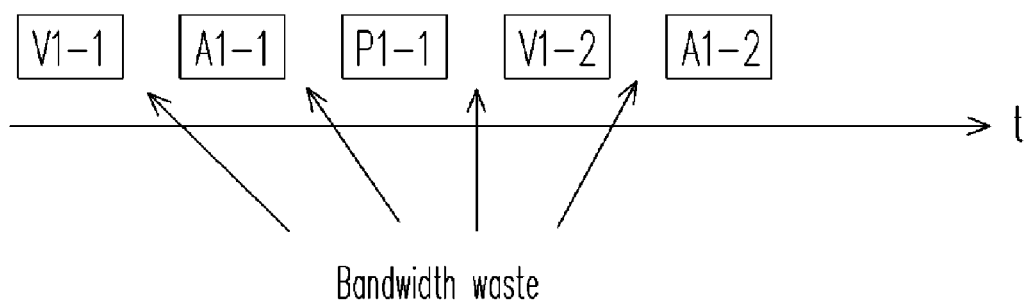
FIG. 1 shows a collection of different types of multimedia network data packets.
FIG. 2 shows the conventional method of transmitting multimedia data.

Reference will now be made in detail to the present preferred embodiments of the invention, examples of which are illustrated in the accompanying drawings. Wherever possible, the same reference numbers are used in the drawings and the description to refer to the same or like parts.

Figure 3:
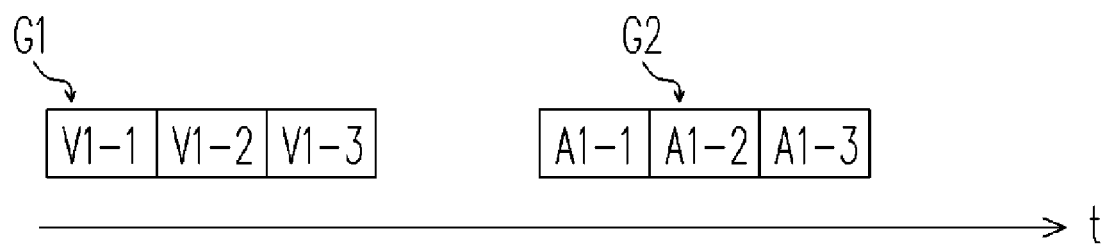
FIG. 3 shows a method for transmitting multimedia data according to one embodiment of the present invention.

FIG. 3 shows a method for transmitting multimedia data according to one embodiment of the present invention. In the present embodiment, the packets for transmitting multimedia data are first classified into image packets, sound packets and general data packets. Thereafter, packets belonging to the same type are consolidated into packet groups and then the data are transmitted in packet group units. For example, in FIG. 3, the first transmitted packet group G1 comprises three image packets V1-1 through V1-3 and the second transmitted packet group G2 comprises three sound packets A1-1 through A1-3. In this way, the inter-packet time gap during packet transmission is minimized and the waste in network bandwidth is reduced.

Figure 4:
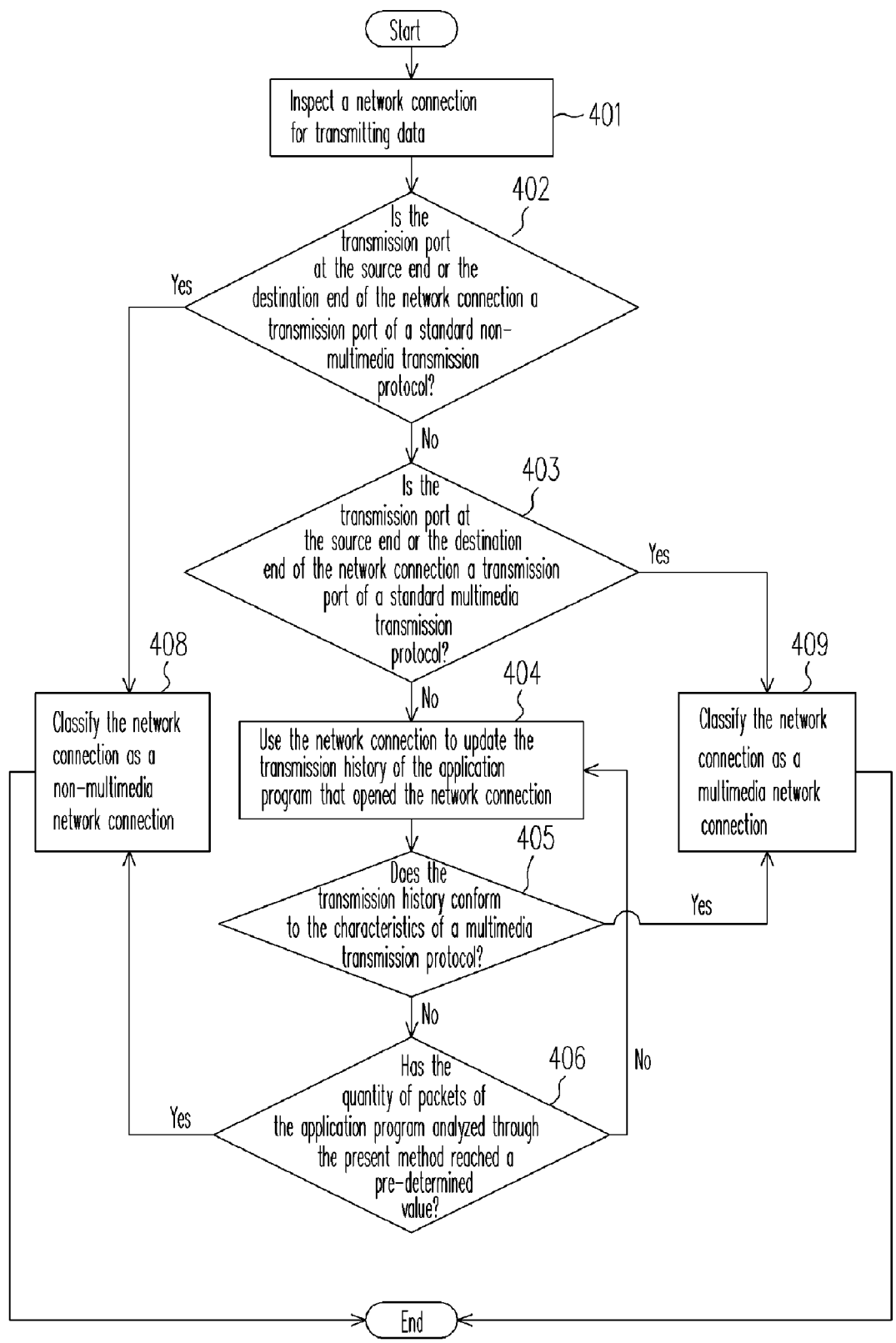
FIG. 4 is a flow diagram showing the steps for classifying network connections according to one embodiment of the present invention.

Before classifying the packets into different types and processing the packets accordingly, a classification of the network connections must be carried out so that the networks transmitting multimedia data are known. FIG. 4 is a flow diagram showing the steps for classifying network connections according to one embodiment of the present invention. Typically, the data is transmitted through the network using a single packet as a unit. When a packet needs to be transmitted to a destination terminal, the flow begins from step 401.

First, in step 401, a network connection is inspected for transmitting data. The data include a plurality of packets and the network connection includes a source transmission port and a destination transmission port. In step 402, the network connection is compared with the transmission port data table of a non-multimedia transmission protocol to determine if the transmission port at the source terminal (for example, a server) or the destination terminal (for example, the personal computer at a client's end) of the network connection is the transmission port of a standard non-multimedia transmission protocol, for example, the transmission port 80 of a hypertext transfer protocol (HTTP). If it is, the network connection is classified as a non-multimedia network connection in step 408. In other words, it is not a network connection for transmitting multimedia data.

If the outcome of the determination in step 402 is negative, the source transmission port and the destination transmission port of the network connection is compared with the transmission port data table of a standard multimedia transmission protocol in step 403 to determine if the source transmission port or the destination transmission port of the network connection is the transmission port for transmitting multimedia transmission protocol. If it is, the network connection is classified as a multimedia network connection in step 409. In other words, the network connection transmits multimedia data.

If the outcome of the determination in step 403 is negative, the information related to the current network connection is used for updating the transmission history of the application program that opened the network connection in step 404. The so-called transmission history refers to the accumulated records of related information of the network connections opened through the same application program, for example, the order of usage of the transmission port. Thereafter, in step 405, the transmission history is checked to determine if it conforms to the characteristics of the multimedia transmission protocol, for example, according to the order of usage of the transmission port as registered by the transmission history or observing the content of the packet as registered by the transmission history or some other methods. If the outcome of the determination in step 405 is positive, the network connection is classified as a multimedia network connection in step 409.

On the contrary, if the outcome of the determination in step 405 is negative, the number of packets analyzed through the application program based on the present method is checked to determine if it reaches a pre-determined value. If the number of packets has reached the pre-determined value, the network connection is classified as a non-multimedia network connection in step 408. Otherwise, the classification is temporarily suspended and step 404 is carried out to analyze the subsequent packets until the number of analyzed packets reaches the pre-determined value.

Figure 5:
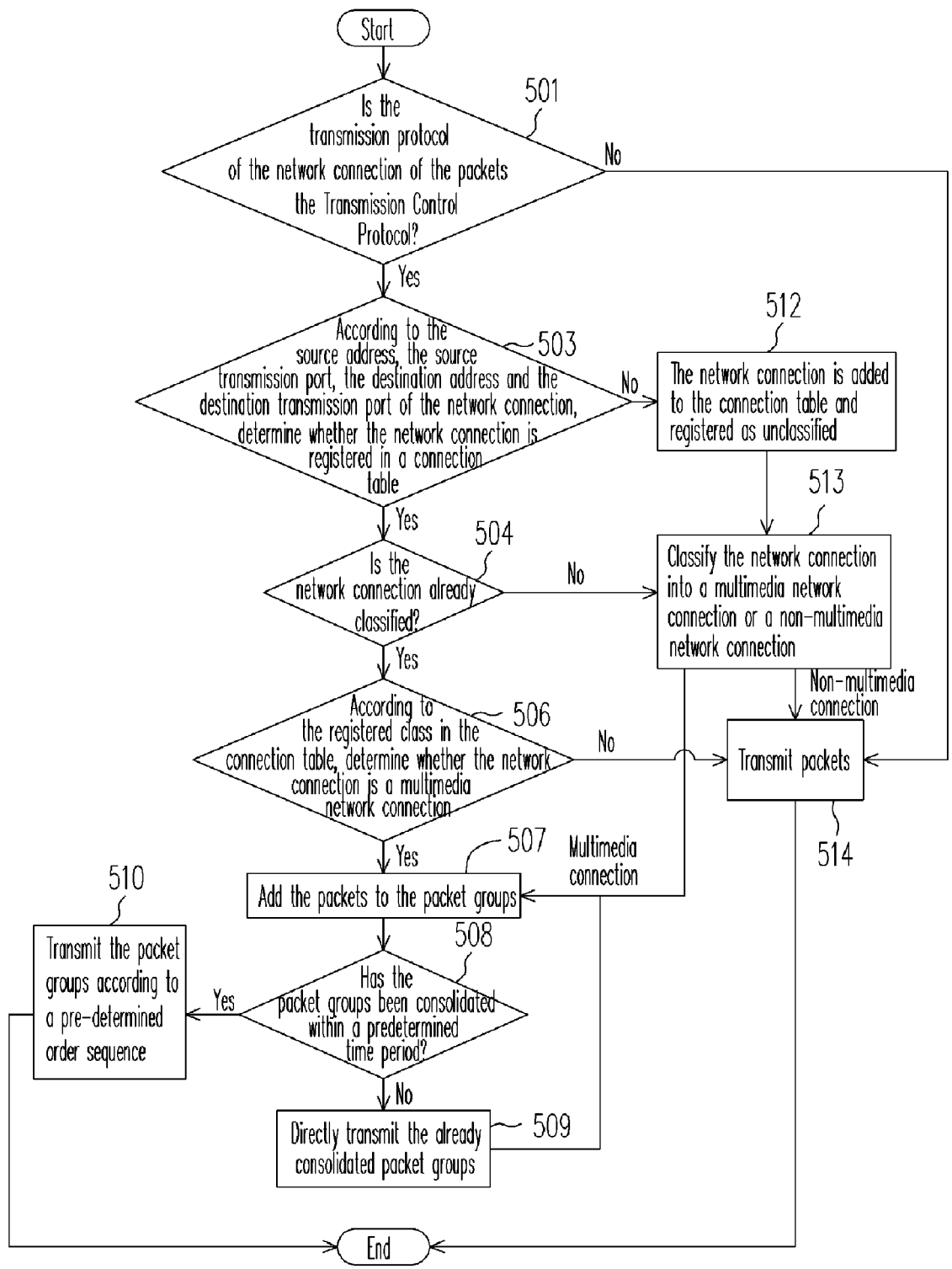
FIG. 5 is a flow diagram showing the steps for transmitting multimedia data according to one embodiment of the present invention.

After explaining the method of classifying the network connections, the following is a detailed description of the method of transmitting multimedia data. FIG. 5 is a flow diagram showing the steps for transmitting multimedia data according to one embodiment of the present invention. When data need to be transmitted through a network, that is, packets need to be transmitted somewhere through the network, the flow begins from step 501.

First, the transmission protocol of the network connection used for transmitting packets is checked in step 501 to determine if it is the Transmission Control Protocol (TCP) or not. If it is not, then the present method for transmitting packets is inapplicable and the packets are directly transmitted in step 514.

Conversely, if the transmission protocol is determined to be TCP in step 501, the network connection is checked in step 503 to determine if it has already been registered by the connection table through four parameters of the network connection. The four parameters are the source address, source transmission port, the destination address and the destination transmission port of the network connection.

If the network connection is found to be unregistered in step 503, the network connection is added to the connection table in step 512 and registered as unclassified. Thereafter, in step 513, the network connection is classified as a multimedia network connection or a non-multimedia network connection. The method of classifying the network connection in step 513 in the present embodiment is the network classification method shown in FIG. 4, but the present invention is not limited as such. After classifying the network connection, if the network connection is verified to be a non-multimedia network connection, packets are transmitted in step 514. On the other hand, if the network connection is verified to be a multimedia network connection, the packets are added to the packet groups in step 507.

If the outcome of the inspection in step 503 shows that the network connection has already been registered, the network connections are checked to determined if they are classified in step 504. If the network connection is unclassified, the network connection is classified to be a multimedia network connection or a non-multimedia network connection in step 513. Thereafter, packets are transmitted in step 514 or packets are added to the packet groups in step 507.

On the contrary, if the outcome of the inspection in step 504 shows that the network connection has already been classified, the network connection is checked to determined if it is a multimedia network connection according to the registered classification in the connection table in step 506. If the network connection is not a multimedia network connection, the present method of transmitting packets is inapplicable and the packets are directly transmitted in step 514.

On the other hand, if the outcome of the inspection in step 506 is affirmative, the packets are added to packet groups in step 509 and the time needed to add the packets into the packet groups is computed. In the present embodiment, the packets for transmitting multimedia data are classified into three major categories, namely, image packets, sound packets and general data packets. Furthermore, each packet group comprises a plurality of packets in the same category.

Because the batch of data that needs to be transmitted comprises a plurality of packets, the number of packets increases with the quantity of data. When the size of the batch of data reaches a certain degree, if all the packets constituting this batch of data need to be added to the packet groups before transmitting, there will be a delay in the transmission of this batch of data. Therefore, the packets in a batch of data must be added to the packet groups in clusters and transmitted in clusters. In step 508, the packet groups are checked to determine if they are fully consolidated within a predetermined time period. In general, the consolidation period depends on the need of the user. If the packet groups have been consolidated, all the packet groups are transmitted according to the pre-determined order in step 510. The ordering is based on the type of packet groups, for example, the one shown in FIG. 3 with the image packet groups G1 transmitted first and then followed by the sound packet groups G2. Alternatively, the order of transmission can be set according to the degree of importance or other ordering methods.

On the other hand, if the outcome of the determination in step 508 shows that the packet groups is still not consolidated within a predetermined time period, this indicates the possibility of having a timeout error in the network connection when the packet groups are being consolidated. Hence, the already consolidated packet groups are directly transmitted in step 509. Thereafter, the packets still not added to the packet groups are added to the packet groups until all the remaining packets of the data are completely transmitted. According to product or the need of the user, the present invention can dispense with the time limiting parameter and introduce a preset value representing the number of packets in a packet group instead. When the number of packets inside any one of the packet groups reaches a consolidation level equal to the preset value, the already consolidated packet groups will transmit according to a pre-determined order so that the packets containing the data are transmitted in batches. Thus, timeout error during the transmission of data on the network is prevented. However, the present invention is not limited as such.

According to the aforementioned embodiment, the first principle behind the present invention is to find the network connection for transmitting multimedia data through a comparison between the transmission ports and analyzing the transmission history of the application program. Then, the packets for transmitting via a multimedia network are classified into groups and the packets containing similar type of data are consolidated into packet groups. Thereafter, according to a pre-determined order based on the data type or degree of importance, the packet groups are sequentially transmitted. Thus, inter-packet time gap during packet transmission is reduced, thereby leading to some saving in the network bandwidth and an increase in the transmission efficiency.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A computer implemented method for classifying network connections, comprising the steps of:
   (A) inspecting a network connection for transmitting at least a data packet, wherein the data packet of the network connection includes a source transmission port and a destination transmission port;
   (B) comparing the source transmission port and the destination transmission port of the data packet with a transmission port data table of a non-multimedia transmission protocol;
   (C) determining the network connection to be a non-multimedia network connection when any one of the source transmission port and the destination transmission port falls into the transmission port data table of the non-multimedia transmission protocol;
   (D) comparing the source transmission port and the destination transmission port with a transmission port data table of a multimedia transmission protocol when none of the source transmission port and destination transmission port falls into the transmission port data table of the non-multimedia transmission protocol;
   (E) determining the network connection to be a multimedia network connection when any one of the source transmission port and the destination transmission port falls into the transmission port data table of the multimedia transmission protocol; and
   (F) determining if the network connection is a multimedia network connection according to a transmission history of an application program that opened the network connection when none of the source transmission port and destination transmission port falls into the transmission port data table of the multimedia transmission protocol,
   wherein steps (A) through (F) are executed in the order as they appear.

2. The network connection classification method of claim 1, wherein the step (F) of determining if the network connection is a multimedia network connection according to the transmission history further comprises:
   (F1) updating the transmission history using the network connection, wherein the transmission history includes the contents of a plurality of packets;
   (F2) comparing the updated transmission history with the characteristic of a multimedia transmission protocol;
   (F3) determining the network connection to be a multimedia network connection when the updated transmission history conforms to the characteristic of the multimedia transmission protocol;
   (F4) determining a relationship between a quantity of compared packets and a pre-determined value when the updated transmission history does not conform to the characteristic of the multimedia transmission protocol;
   (F5) returning to step (F1) when the packet quantity is smaller than the pre-determined value; and
   (F6) determining the network connection to be a non-multimedia network connection when the packet quantity is greater than the pre-determined value.

3. The network connection classification method of claim 2, wherein the characteristics of the multimedia transmission protocol includes the content of the plurality of packets.

4. A computer implemented multimedia data transmission method, comprising the steps of:
   (A) determining if the transmission protocol of a network connection for transmitting a packet is the Transmission Control Protocol or not;
   (B) if the transmission protocol of the network connection is the Transmission Control Protocol, determining if the network connection has already been registered in a connection table according to the source address, the source transmission port, the destination address and the destination transmission port of the network connection;
   (C) if the network connection has not been registered in the connection table, adding the network connection into the connection table as unclassified and classifying the network connection to be a multimedia network connection or a non-multimedia network connection;
   (D) if the network connection has already been registered in the connection table and is unclassified, classifying the network connection to be a multimedia network connection or a non-multimedia network connection;
   (E) if the network connection has already been registered in the connection table and is classified, determining if the network connection is a multimedia network connection according to the registered classification in the connection table;
   (F) adding the packet into a packet group if the network connection is a multimedia network connection; and
   (G) transmitting the packet group according to a pre-determined sequence after the consolidation of the packet group is complete,
   wherein the step of classifying a network connection into a multimedia network connection or non-multimedia network connection further includes:
   if the source transmission port or the destination transmission port of the network connection is a transmission port of a non-multimedia transmission protocol, classifying the network connection to be a non-multimedia network connection;
   if the source transmission port or the destination transmission port of the network connection is a transmission port of a multimedia transmission protocol, classifying the network connection to be a multimedia network connection; and
   if the source transmission port or the destination transmission port of the network connection is neither a transmission port of a non-multimedia transmission protocol nor a transmission port of a multimedia transmission protocol, classifying the network connection to be a multimedia network connection or a non-multimedia network connection according to a transmission history of an application program that opened the network connection.

5. The multimedia data transmission method of claim 4, wherein the step of classifying the network connection according to the transmission history further includes:
   updating the transmission history with the network connection; if the transmission history conforms to the characteristic of a multimedia transmission protocol, classifying the network connection to be a multimedia network connection;
   if the transmission history does not conform to the characteristic of the multimedia transmission protocol and the number of packets analyzed through the application program using the multimedia data transmission method has reached a pre-determined value, classifying the network connection to be a non-multimedia network connection; and
   if the transmission history does not conform to the characteristic of the multimedia transmission protocol and the number of packets analyzed through the application program using the multimedia data transmission method has not reached the pre-determined value, temporarily suspending the classification of the network connection.

6. The multimedia data transmission method of claim 5, wherein the multimedia data transmission method uses the content of the packets registered by the transmission history to determine if the transmission history conforms to the characteristic of a multimedia transmission protocol.

7. The multimedia data transmission method of claim 4, wherein the packet is classified into three different types including image packets, sound packets and general data packets and each packet group comprises a plurality of packets of the same type.

8. The multimedia data transmission method of claim 4, wherein the step of transmitting the packet group further includes:
   directly transmitting the already consolidated packet group when the packets cannot be fully consolidated within a predetermined time period.

9. A method for transmitting data through classification of network connections, comprising the steps of:
   (A) determining if the transmission protocol of a network connection is the Transmission Control Protocol or not, wherein the network connection includes a plurality of first packets;
   (B) directly transmitting the first packets through the network connection when the transmission protocol is not the Transmission Control Protocol;
   (C) determining if the network connection has already been registered in a connection table when the transmission protocol of the network connection is the Transmission Control Protocol;
   (D) if the network connection has not been registered in the connection table, adding the network connection to the connection table, registering the network connection as unclassified, and directly executing the step (F) below;
   (E) determining if the network connection has already been classified as a multimedia network connection or a non-multimedia network connection when the network connection has already been registered in the connection table;
   (F) classifying the network connection as a multimedia network connection or a non-multimedia connection according to a classification method when the network connection has not yet been classified;
   (G) directly transmitting the first packets through the network connection when the network connection is a non-multimedia network connection;
   (H) directly executing the step (J) below when the network connection is the multimedia network connection;
   (I) directly transmitting the first packets through the network connection when the network connection has already been classified and the network connection is a non-multimedia network connection;
   (J) adding the first packets to a packet group when the network connection has already been classified and the network connection is the multimedia network connection; and
   (K) transmitting the packet group through the network connection.

10. The data transmission method of claim 9, wherein the classification method includes:
   (L1) inspecting the network connection, wherein the network connection includes a source transmission port and a destination transmission port;
   (L2) comparing the source transmission port and the destination transmission port with a transmission port data table of a non-multimedia transmission protocol;
   (L3) determining the network connection to be a non-multimedia network connection when any one of the source transmission port and the destination transmission port falls into the transmission port data table of the non-multimedia transmission protocol;
   (L4) comparing the source transmission port and the destination transmission port with the transmission port data table of a multimedia transmission protocol when any one of the source transmission port and destination transmission port does not fall into the transmission port data table of the non-multimedia transmission protocol;
   (L5) determining the network connection to be a multimedia network connection when any one of the source transmission port and the destination transmission port falls into the transmission port data table of the multimedia transmission protocol; and
   (L6) determining if the network connection is a multimedia network connection according to the transmission history of an application program that opened the network connection when any one of the source transmission port and destination transmission port does not fall into the transmission port data table of the multimedia transmission protocol.

11. The data transmission method of claim 10, wherein the step (L6) of determining if the network connection is a multimedia network connection according to the transmission history further comprises:
   (M1) updating the transmission history using the network connection, wherein the transmission history includes the content of a plurality of second packets;
   (M2) comparing the updated transmission history with the characteristic of a multimedia transmission protocol;
   (M3) determining the network connection to be a multimedia network connection when the updated transmission history conforms to the characteristic of the multimedia transmission protocol;
   (M4) determining a relationship between a quantity of compared second packets and a pre-determined value when the updated transmission history does not conform to the characteristic of the multimedia transmission protocol;
   (M5) returning to step (M1) when the packet quantity is smaller than the pre-determined value; and
   (M6) determining the network connection to be a non-multimedia network connection when the packet quantity is greater than the pre-determined value.

12. The data transmission method of claim 11, wherein the characteristics of the multimedia transmission protocol includes the content of the second packets.

13. The data transmission method of claim 9, wherein the first packets are classified into three different types including image packets, sound packets and general data packets and each packet group comprises a plurality of packets of the same type.

14. The data transmission method of claim 9, wherein the step of transmitting the packet group further includes:
   directly transmitting the already consolidated packet groups when the first packets cannot be fully consolidated within a predetermined time period and continuing with the consolidation of unconsolidated first packets.

15. The data transmission method of claim 9, wherein the step of transmitting the packet group further includes:
   directly transmitting the already consolidated packet groups when the packet quantity within any one of the packet groups reaches a pre-determined value and continuing with the consolidation of unconsolidated first packets.

* * * * *